United States Patent [19]

Benzel

[11] Patent Number: 4,932,340
[45] Date of Patent: Jun. 12, 1990

[54] SUBSOIL PLACEMENT APPARATUS

[76] Inventor: John E. Benzel, 2501 5th Ave., Scottsbluff, Nebr. 69362

[21] Appl. No.: 329,337

[22] Filed: Mar. 27, 1989

Related U.S. Application Data

[63] Continuation of Ser. No. 88,274, Aug. 24, 1987, abandoned.

[51] Int. Cl.⁵ ............................................. A01C 5/08
[52] U.S. Cl. ...................................... 111/187; 111/80; 111/167; 111/194
[58] Field of Search ............... 172/744, 603; 111/121, 111/186, 163, 187, 167–169, 194, 34, 73, 80, 164, 165, 166, 157

[56] References Cited

U.S. PATENT DOCUMENTS

| | | | |
|---|---|---|---|
| 680,061 | 8/1901 | Molhring | 111/168 |
| 737,151 | 8/1903 | Saltzman | 111/164 |
| 799,631 | 9/1905 | Case | 111/168 |
| 1,036,436 | 8/1912 | Brennan | 111/164 |
| 1,049,265 | 12/1912 | Rieske | 111/164 |
| 1,184,508 | 5/1916 | Beeman et al. | 111/164 |
| 1,204,239 | 11/1916 | Bozard | 111/164 |
| 2,023,655 | 12/1935 | White | 111/194 |
| 2,842,078 | 7/1958 | Immesoete | 111/87 |
| 2,920,587 | 1/1960 | Shriver | 111/80 |
| 3,348,505 | 10/1967 | Smith | 111/164 |
| 3,598,069 | 8/1971 | Hatcher | 111/194 |
| 4,273,057 | 6/1981 | Pollard | 111/164 |
| 4,560,011 | 12/1985 | Peterson et al. | 172/744 |
| 4,732,398 | 3/1988 | Biss | 111/167 |

FOREIGN PATENT DOCUMENTS

| | | | |
|---|---|---|---|
| 1503779 | 12/1967 | France | 172/603 |
| 2001513 | 2/1979 | United Kingdom | 111/169 |

Primary Examiner—Danton D. DeMille
Attorney, Agent, or Firm—Fields, Lewis, Pittenger & Rost

[57] ABSTRACT

Soil-treating materials are placed in the soil in a desired relation to the seed by placement apparatus that preferably follows the seed-depositing mechanism on a planter and deposits the material a selected distance to one side and below the deposited seed. The apparatus includes a disc assembly including a generally vertical disc and an upright mounting shaft together with a feed tube affixed to the mounting shaft. A mounting bracket that mounts to the planter frame slidably receives the mounting shaft and provide for vertical and angular adjustment of the disc assembly and its ready removal from or attachment to the planter.

8 Claims, 2 Drawing Sheets

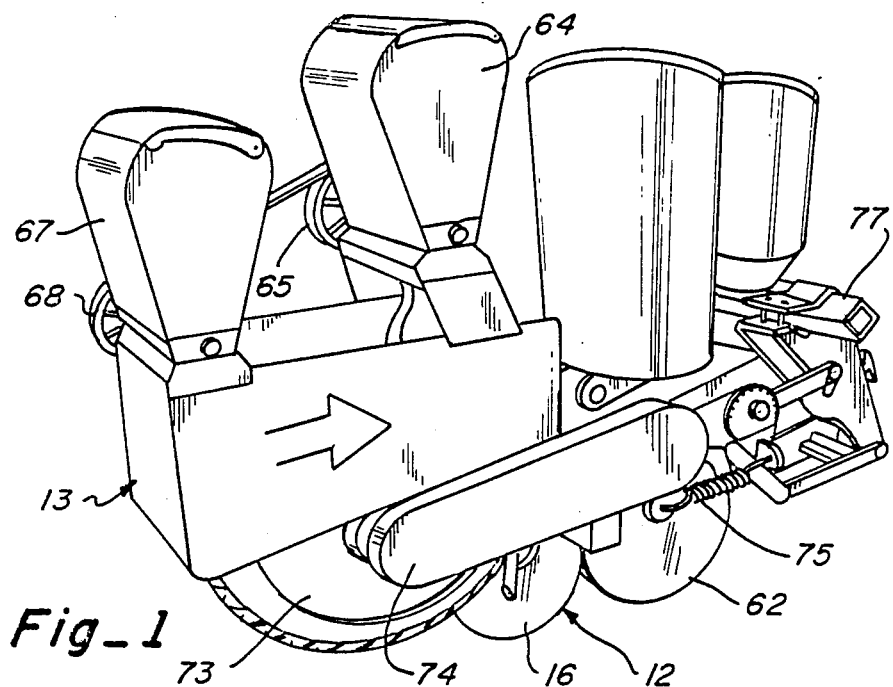
Fig_1
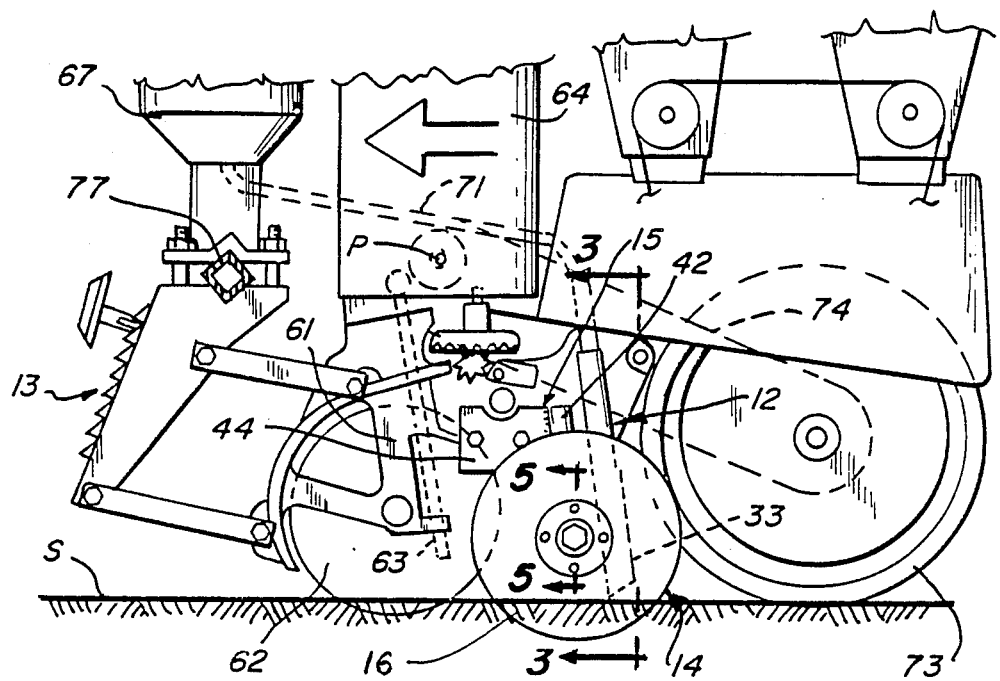
Fig_2

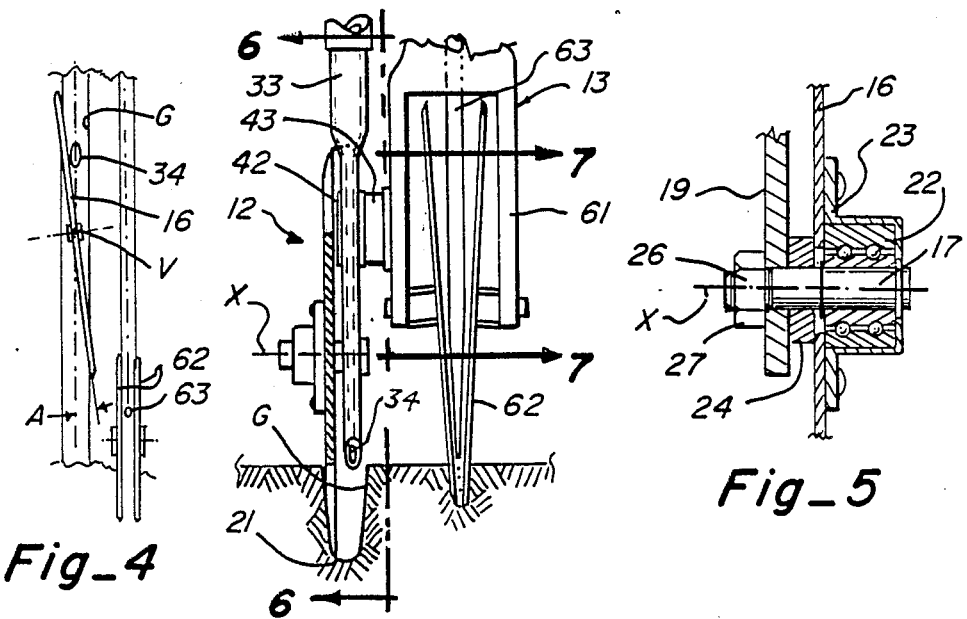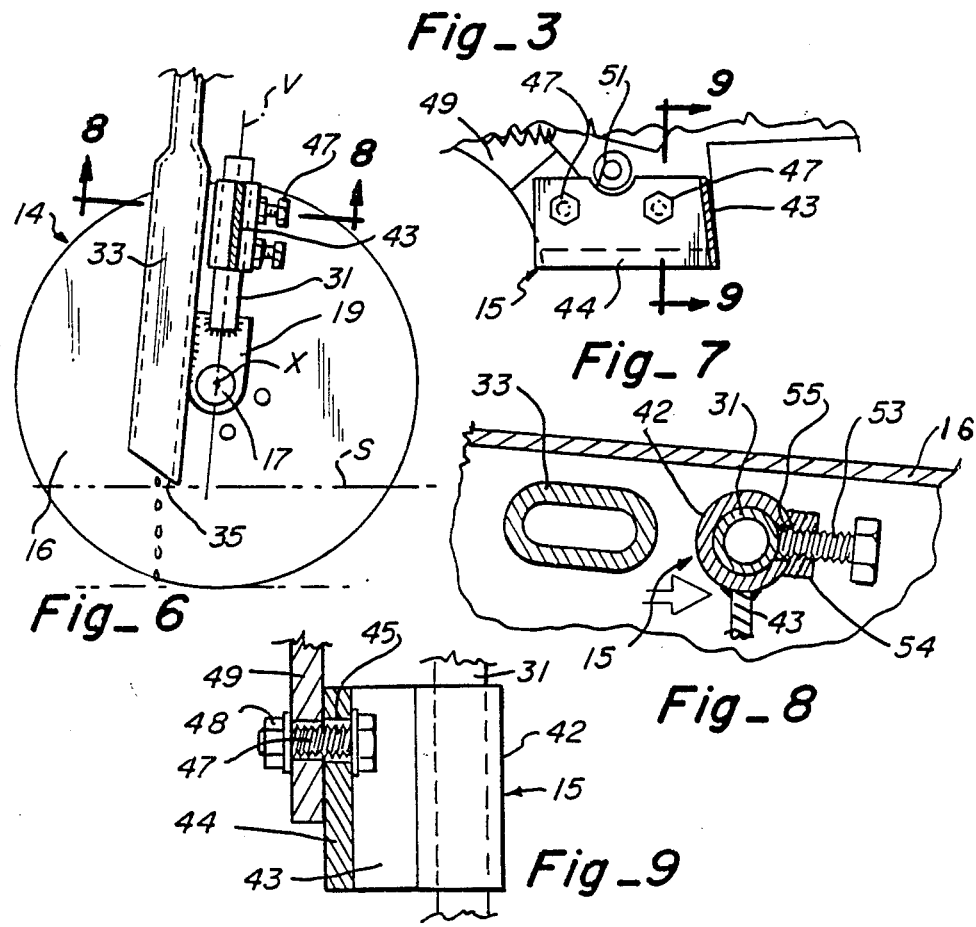

SUBSOIL PLACEMENT APPARATUS

This application is a continuation of application Ser. No. 088,274, filed Aug. 24, 1987, now abandoned.

TECHNICAL FIELD

This invention relates to a novel and improved apparatus for placing soil-treating materials in the soil to enhance crop growth.

BACKGROUND ART

Attempts have been made to provide apparatus for distributing or placing soil-treating materials such as insecticides and fertilizers into the soil to enhance the growth of plants.

In general, apparatus presently available for this purpose is not constructed to place the material in the same relation to each plant at a uniform depth and further has problems of collecting weeds and debris as the apparatus is moved along a crop row. Prior known apparatus associated with planters locate the apparatus forwardly or ahead of the seed-distributing means and this approach has not been entirely satisfactory.

DISCLOSURE OF THE INVENTION

Placement apparatus for soil-treating materials disclosed attaches to a planter having a seed depositing arrangement including a furrow-opener and seed discharge tube. The apparatus includes a disc assembly held to the planter by a mounting bracket. The disc assembly has a generally vertical, rotating disc preferably flat and with a sharp, peripheral cutting edge which forms a groove in the soil a selected distance to one side of and to a selected depth from the deposited seed together with a feed tube behind and movable with the disc. The feed tube so arranged places a selected soil-treating material in the groove formed by the disc at a substantially uniform depth in relation to the seed.

BRIEF DESCRIPTION OF THE DRAWINGS

FIG. 1 is a perspective view of placement apparatus embodying features of the present invention mounted on a planter;

FIG. 2 is a side elevation view of the placement apparatus shown in FIG. 1 with portions removed and broken away to show interior parts;

FIG. 3 is a sectional view taken along lines 3—3 of FIG. 2;

FIG. 4 is a schematic top plan view of the disc assembly showing the disc turned at an angle about a vertical axis from a straight ahead position.

FIG. 5 is a sectional view taken along lines 5—5 of FIG. 3;

FIG. 6 is a sectional view taken along lines 6—6 of FIG. 3;

FIG. 7 is a sectional view taken along lines 7—7 of FIG. 3;

FIG. 8 is a sectional view taken along lines 8—8 of FIG. 6;

FIG. 9 is a sectional view taken along lines 9—9 of FIG. 7;

DETAILED DESCRIPTION

Referring now to FIGS. 1-9 there is shown placement apparatus generally designated by numeral 12 embodying features of the present invention shown mounted on a planter 13. The subsoil materials may be granular or fluids and may be insecticides, pesticides or fertilizer. The placement apparatus 12 shown, in general, includes a disc assembly 14 mounted to the planter by means of a mounting bracket 15. The disc assembly includes a single disc 16 mounted for free rotation on a shaft 17 carried by a support hub 19. The disc is flat or flat-sided and is circular and has a sharp peripheral cutting edge 21. Preferably, in use, the disc is disposed generally vertically to rotate about a generally horizontal axis or axis or rotation designated X and is preferably turned to one side at a selected angle designated A relative to a straight ahead position as best seen in FIG. 4 to cut a groove G of a selected width in the soil for receiving the soil-treating material as described more fully hereinafter.

The support shaft 17 is secured in the inner race of a bearing 22 which in turn has the outer race secured in a bearing housing 23 affixed to the disc. A washer or spacer 24 is provided between the hub and disc. Shaft 17 has an externally threaded end portion 26 on which a nut 27 is threaded to secure the shaft to the hub and provide for free rotation of the disc relative to the shaft and hub 19. This also enables the disc to be readily assembled to and removed from the hub. A mounting shaft 31 shown as hollow is affixed at one end of the support hub 19 and extends radially out from the support. The mounting shaft 31 is disposed in a generally upright or vertical position on the planter about an upright axis designated V. The hollow shaft allows for a bending of the shaft as a safety feature if an obstruction is encountered.

A feed tube 33 is affixed along one side of the support hub 19 and extends at an offset position relative to the axis of rotation and generally parallel with the mounting shaft 31. Tube 33 has an upper end portion that has a circular cross-section and the lower end portion and discharge opening 34 that is flattened or elongated in shape to assist in having the material pass therethrough. Tube 33 has a bottom discharge opening 34 formed along a beveled edge 35. The bevel is up and rearwardly at an angle from the leading edge. The leading edge of tube 33 is shown disposed at approximately ground level indicated at surface 5. After the disc 16 cuts a groove G in the soil the soil-treating material will be deposited by the feed tube into approximately the center of the groove G a selected distance to one side and below the ground surface S so as to effect the best plant growth.

The mounting bracket 15 includes a tubular end member 42 which is disposed upright into which the mounting shaft 31 is slidably and telescopically received with a lateral spacer section 43 affixed at one end to the tube and a mounting plate 44 that connects at one end to section 43 and extends at right angles to section 43. The extent of the spacer section 43 establishes the distance the material is deposited to the side of the seed. This distance could also be changed by using shims between the plate 44 and the frame. The mounting plate 44 is provided with two laterally spaced bolt holes 45 through which bolts 47 extend. A nut 48 on the end of each bolt 45 fastens the mounting bracket to the planter frame 61. The mounting plate 44 is provided with a recess 51 in the top edge to clear a scraper mount presently found on the illustrated planter 13.

The mounting shaft 31 is telescopically received in the tubular end member 42 so that the disc assembly 14 may be moved up and down relative to the support frame to adjust the depth of the disc 16 in the soil. A pair of spaced set bolts 53 thread into an associated nut 54 on the formed side of the tubular member 42 and each set bolt extends through a hole 55 in the tubular member to releasably fasten the disc assembly to the frame at a selected elevation. Moreover, shaft 31 will rotate in member 42 to provide for the rotation of the disc from a straight ahead position to a selected angle A to widen or narrow the groove as required.

The planter 13 illustrated is a John Deere 71 Flexi-Planter having a frame 61 on which there is mounted a double-disc seed opener or furrow opener 62 having a seed feed tube 63 extending down between the double disc and terminating above the ground level to discharge seed into the furrow formed by the seed opener. Seed is supplied to the tube from a hopper 64 mounted on the frame that is agitated by an internal agitator activated by rotating a pulley 65 which rotates as the planter is moved. A supply hopper 67 is mounted on the frame that also has an agitator activated by a pulley 68 to deliver the soil-treating material to the feed tube 33 via a line 71.

The planter 13 shown further has a press wheel 73 mounted on the free end of a pivoting frame 74 that pivots about pivot P. A tension spring 75 is connected between the planter frame and the rear end of the press wheel frame to resiliently urge the press wheel against the soil. The press wheel trails the above described grooves containing the soil-treating material and seed to pack the soil. A tool bar 77 is shown at the forward end of the planter to which the planter is attached. The tool bar may be on any of a variety of vehicles to move the planter along a crop row.

By way of example and not limitation, the disc 16 will have a diameter of 8½, 9 or 13 inches. The disc is located about 2 to 2½ inches to the side of the seed depositing device and cuts to a depth to 3 to 3½ inches into the soil so as to be about 2 to 2½ inches deeper than the seed. The angle A is between about 1 to 5 degrees to provide a groove having a width of about 0.25 inches.

In the operation of the above described apparatus, as the planter is moved along the ground the furrow-opener makes a furrow and the seed is deposited in the soil. The disc 16 which follows the furrow-opener then cuts a groove and the material is deposited through the feed tube 33 into the groove. The trailing press wheel 62 then presses down against both grooves that have been formed.

Although the present invention has been described with a certain degree of particularity, it is understood that the present disclosure has been made by way of example and that changes in details of structure may be made without departing from the spirit thereof.

What is claimed is:

1. In agricultural apparatus the combination of:
   a planter having a frame adapted to be moved up and down and seed depositing means having a discharge outlet carried by said frame,
   a press wheel rearwardly of said seed depositing means on a support arm pivotally connected at a front end to said frame to enable said press wheel to move up and down relative to said frame in response to surface contour changes over which the press wheel moves,
   a disc assembly mounted by a mounting bracket to said frame rearwardly of said seed depositing means and forwardly of said press wheel, said disc assembly including a generally vertical disc mounted about a substantially vertical axis with the disc forming an acute angle to the direction of travel and a hollow mounting shaft supporting said disc, and a feed tube rearwardly of the axis of rotation of said disc and affixed to the side of said mounting shaft to deposit material in a groove formed by said disc and with the deposited material mounted in the same relation to the seed deposited and at a substantially uniform depth, there being connected between said mounting bracket and said hollow mounting shaft, a tubular member mounted on said hollow mounting shaft, and a spacer section of a selected width connected between said tubular member and said mounting bracket, said mounting bracket being in the form of a mounting plate affixed to said spacer section and releasably attaching said spacer section and tubular member to said frame.

2. In subsoil placement apparatus for soil-treating materials adapted to be moved over a ground surface of irregular contour along a crop row, the combination comprising:
   a frame,
   a seed depositing means having a discharge outlet and mounted on said frame adapted to be moved up and down to set said discharge outlet of the seed depositing means at a selected depth in the soil and moved through the soil to form a furrow and deposit seed therein,
   a press wheel rearwardly of said seed depositing means on a support arm pivotally connected at a front end to said frame to enable said press wheel to move up and down relative to said frame in response to surface contour changes over which the press wheel moves, and
   a disc assembly rearwardly of said seed depositing means including a disc and a feed tube having a discharge opening, said disc assembly being mounted on said frame for forming a groove and delivering a soil-treating material into said groove via said discharge opening as said disc assembly is moved through the soil with said press wheel moving up and down in response to surface contour changes and with the deposited material maintained in the same relation to the seed deposited and at a substantially uniform depth,
   said mounting for said disc assembly on said frame including a tubular member adapted to be disposed upright in which a mounting shaft is slidably received, a flange section extending laterally of the tubular member to establish the lateral position of said disc in relation to seed in the soil and a mounting plate affixed to said section adapted to mount to a frame for moving said disc assembly relative to seed in the soil.

3. Apparatus as set forth in claim 2 including releasable locking means on said tubular member for locking said disc assembly at a selected elevation and said disc at a selected acute angle to the direction of travel.

4. In subsoil placement apparatus for soil-treating materials adapted to be moved over a ground surface of irregular contour along a crop row, the combination comprising:
   a frame;
   a seed depositing means having a discharge outlet and mounted on said frame adapted to be moved up and down to set said discharge outlet of the seed depositing means at a selected depth in the soil and moved through the soil to form a furrow and deposit seed therein, a press wheel rearwardly of said seed depositing means on a support arm pivotally connected at a front end to said frame to enable said press wheel to move up and down relative to said frame in response to surface contour changes over which the press wheel moves, and a disc assembly rearwardly of said seed depositing means including a disc and a feed tube having a discharge opening, said disc assembly being mounted on said frame for forming a groove and delivering a soil-treating material into said groove via said discharge opening as said disc assembly is moved through the soil with said press wheel moving up and down in response to surface contour changes and with the deposited material maintained in the same relation to the seed deposited and at a substantially uniform depth, said disc assembly including a support hub, a support shaft supported by said hub and bearing means on said shaft for supporting said disc for free rotation on said shaft, said disc assembly including a mounting shaft affixed at one end to said support hub and extending radially out from a line through the axis of rotation of said disc, said feed tube being affixed along the side of said support hub and extending at an offset position relative to said axis of rotation and generally parallel with said mounting shaft.

5. Apparatus as set forth in claim 4 wherein said discharge opening is formed along a beveled end of said feed tube, said beveled end extending up and rearwardly from a leading edge and is located below said axis of rotation and above the lowermost part of a peripheral cutting edge of said disc to discharge material at approximately ground surface level.

6. Apparatus as set forth in claim 4 wherein said feed tube and discharge opening has a flattened, elongated cross-section.

7. Apparatus as set forth in claim 4 wherein said disc assembly is mounted to said frame by an adjustable mounting means, said adjustable mounting means being engageable with said mounting shaft for said disc, said disc being disposed in a generally vertical position a selected distance to one side and rearwardly of said seed depositing means with said discharge opening being set a selected distance rearwardly to one side of and below said discharge outlet.

8. Apparatus as set forth in claim 4 wherein said disc is a relatively thin, flat-sided, circular, single body.

* * * * *